US011377021B2

(12) United States Patent
Kratzer et al.

(10) Patent No.: US 11,377,021 B2
(45) Date of Patent: Jul. 5, 2022

(54) MOTOR VEHICLE HEADLIGHT HAVING AT LEAST TWO LIGHT MODULES

(71) Applicant: Marelli Automotive Lighting Reutlingen (Germany) GmbH, Reutlingen (DE)

(72) Inventors: Markus Kratzer, Reutlingen (DE); Michael Scholl, Reutlingen (DE); Stephanie Strahl-Schäfer, Reutlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 38 days.

(21) Appl. No.: 15/734,465

(22) PCT Filed: Jun. 3, 2019

(86) PCT No.: PCT/EP2019/064361
§ 371 (c)(1),
(2) Date: Dec. 2, 2020

(87) PCT Pub. No.: WO2019/233953
PCT Pub. Date: Dec. 12, 2019

(65) Prior Publication Data
US 2021/0213867 A1 Jul. 15, 2021

(30) Foreign Application Priority Data

Jun. 8, 2018 (DE) .................... 10 2018 113 768.0

(51) Int. Cl.
*B60Q 1/00* (2006.01)
*F21S 41/24* (2018.01)
(Continued)

(52) U.S. Cl.
CPC ............. *B60Q 1/0041* (2013.01); *B60Q 1/28* (2013.01); *F21S 41/145* (2018.01);
(Continued)

(58) Field of Classification Search
CPC ........ B60Q 1/0041; B60Q 1/28; B60Q 41/24; B60Q 41/275; B60Q 41/255;
(Continued)

(56) References Cited

U.S. PATENT DOCUMENTS 5,833,345 A * 11/1998 Ito ........................ B60Q 1/0041
362/249.07
7,993,043 B2 * 8/2011 Sazuka ................... F21S 41/13
362/509
(Continued)

FOREIGN PATENT DOCUMENTS

DE 19602168 A1 8/1996
DE 19627936 A1 1/1998
(Continued)

OTHER PUBLICATIONS

Search Report for German Patent Application No. 102018113768.0 dated May 10, 2019.
International Search Report and Written Opinion of the International Searching Authority for PCT International Application No. PCT/EP2019/064361 dated Sep. 4, 2019.

*Primary Examiner* — Bryon T Gyllstrom
(74) *Attorney, Agent, or Firm* — Howard & Howard Attorneys PLLC

(57) ABSTRACT

A motor vehicle headlight, that includes a main-light module that provides a dipped main-light function having a mainly horizontal cut-off line and a secondary light module that provides two individually controllable light functions: one main-light function and one less powerful additional light function. The dipped main-light function of the main-light module is activated in conjunction with the additional light function of the secondary light module, such that the at least
(Continued)

one secondary light module appears to be illuminated approximately as brightly as the main-light module. The secondary light module has a light guide plate into which light is coupled that propagates in the light guide plate using total reflection, and the light guide plate has output elements for outputting the propagating light from the light guide plate. The light output of the light guide plate illuminates an area above the cut-off line of the dipped main-light function of the main-light module.

17 Claims, 5 Drawing Sheets

(51) Int. Cl.
*F21S 41/275* (2018.01)
*F21S 41/255* (2018.01)
*F21S 41/145* (2018.01)
*F21S 41/151* (2018.01)
*B60Q 1/28* (2006.01)
*F21W 102/135* (2018.01)

(52) U.S. Cl.
CPC ............ *F21S 41/151* (2018.01); *F21S 41/24* (2018.01); *F21S 41/255* (2018.01); *F21S 41/275* (2018.01); *B60Q 2400/30* (2013.01); *F21W 2102/135* (2018.01)

(58) Field of Classification Search
CPC ..... B60Q 41/145; B60Q 41/151; F21S 41/24; F21S 41/275; F21S 41/255; F21S 41/145; F21S 41/151
USPC ....................................................... 362/459
See application file for complete search history.

(56) References Cited

U.S. PATENT DOCUMENTS

| | | | | |
|---|---|---|---|---|
| 8,936,381 | B2* | 1/2015 | Luger | F21S 41/143 |
| | | | | 362/543 |
| 9,046,237 | B2* | 6/2015 | Stefanov | F21S 41/24 |
| 9,328,889 | B2 | 5/2016 | Anzai | |
| 9,696,002 | B2* | 7/2017 | Ohashi | F21S 43/33 |
| 2003/0072167 | A1* | 4/2003 | Albou | F21S 43/31 |
| | | | | 362/543 |
| 2004/0136203 | A1* | 7/2004 | Gasquet | F21S 43/249 |
| | | | | 362/543 |
| 2010/0290243 | A1* | 11/2010 | Janssen | F21S 43/239 |
| | | | | 362/519 |
| 2012/0275173 | A1* | 11/2012 | Hamm | F21S 41/24 |
| | | | | 362/487 |
| 2015/0078026 | A1 | 3/2015 | Erdl et al. | |
| 2016/0046340 | A1 | 2/2016 | Oguchi | |
| 2016/0109084 | A1 | 4/2016 | Potter et al. | |
| 2017/0205043 | A1 | 7/2017 | Tokieda et al. | |
| 2022/0032839 | A1* | 2/2022 | Kim | B60Q 5/005 |

FOREIGN PATENT DOCUMENTS

| | | |
|---|---|---|
| DE | 10101795 A1 | 7/2002 |
| DE | 102007005779 A1 | 8/2008 |
| DE | 102011076621 A1 | 11/2012 |
| DE | 102012208516 A1 | 11/2013 |
| DE | 102017102004 A1 | 8/2018 |
| EP | 1342616 A2 | 9/2003 |
| EP | 2119956 A1 | 11/2009 |
| EP | 2159481 A1 | 3/2010 |
| EP | 2784376 A2 | 10/2014 |
| KR | 20150072620 A | 6/2015 |

* cited by examiner

MOTOR VEHICLE HEADLIGHT HAVING AT LEAST TWO LIGHT MODULES

CROSS-REFERENCE TO RELATED APPLICATIONS

The present application is a National Stage of International Patent Application No. PCT/EP2019/064361, filed on Jun. 3, 2019, which claims priority to and all the benefits of German Patent Application No. 102018113768.0, filed on Jun. 8, 2018, both of which are hereby expressly incorporated herein by reference in their entirety.

BACKGROUND OF THE INVENTION

1. Field of the Invention

This invention relates to a motor vehicle headlight having at least two light modules. The headlight is designed to provide at least one dipped light function in a light-emitting direction of the headlight.

2. Description of the Related Art

Various motor vehicle headlights are known in the art, which have at least two light modules, which are designed either individually or in different combinations with each other to provide various light functions of the headlight. In a particularly simple case, one of the light modules is designed to provide a low-beam distribution and another of the light modules is designed to produce a high-beam distribution. However, motor vehicle headlights, in which a first light module provides a first part of a light distribution (e.g., a low-beam basic light distribution) and another light module produces a second part of the light distribution (e.g., a low-beam spot light distribution), are also known. The light modules can be designed as reflection modules or projection modules. It is also known to integrate additional optical elements (e.g., additional light sources, primary optics, optical wave guides) into the light modules to be able to provide different light functions using just one light module. In this context, reference is made to EP 2 159 481 A1 and DE 101 01 795 A1 by way of example.

EP 2 159 481 A1 discloses a lighting device for a motor vehicle, comprising a first light source and a reflector for providing a dipped light distribution (e.g., low-beam light or fog light) and second light sources which, in conjunction with a light guide plate, provide a signal light function (e.g., daytime running light or side marker light). From DE 101 01 795 A1 a flashing light for a motor vehicle is known, which comprises a first light source and a reflector for providing the flashing light in addition to a second light source to provide a side marker light in conjunction with a light guide plate, which is arranged in the beam path of the flashing light.

Furthermore, in the case of motor vehicle headlights having several light modules, it is known from the state of the art that if one of the light modules provides a certain light function of the headlight (e.g., a low-beam distribution), the other light modules of the headlight are also activated at least at a lower intensity i.e., for an observer looking towards the emitted light of the headlight, all light modules appear to be illuminated having approximately the same brightness. In this context, reference is made to DE 10 2012 208 516 A1 by way of example.

DE 10 2012 208 516 A1 discloses a motor vehicle headlight having two light modules, a so-called low-beam module and an adaptive beam module comprising an annular optical wave guide extending around an outer edge of a reflector or projection lens of the low-beam module or any other light module of the headlight. To provide a low-beam distribution of the headlight, both the low-beam module and the adaptive beam module are activated, the low-beam module providing less than 15%, preferably less than 5%, of the luminous intensity emitted by the headlight with respect to the vertical orientation above the cut-off line and the adaptive beam module, in return, providing more than 80%, preferably more than 90%, of the luminous intensity emitted by the headlight with respect to the vertical orientation above the cut-off line. In addition, the adaptive beam module can provide a daytime running light distribution, wherein the low-beam module is deactivated. The aim in doing so is to ensure that the appearance of the headlight is always determined by the adaptive beam module for an observer looking towards the emitted light of the headlight towards the emitted light, such that the headlight design known as "Angel Eyes" having illuminated halos is results both in the low-beam mode of the headlight and in the daytime running light mode. No explanations are given in this publication regarding the concrete technical implementation of the known headlight.

For a headlight having several light modules, it is desirable that all modules look similar to the observer from the outside when the headlight is on. The aim here is to ensure that, regardless of which of the headlight's light modules provides a dipped light distribution, the observer is always under the impression that all the headlight's light modules shine at approximately the same brightness. This impression of the observer is essentially determined by the light sent into the glare-free zone above the cut-off line of the dipped light distribution, because the observer's eyes are usually located in this zone.

In the example of a headlight comprising a low-beam module and a high-beam module, the low-beam module is activated and the high-beam module is deactivated when the headlight provides a low-beam light. Nevertheless, it is desirable that to an observer the high-beam module also appears to be about as bright and similarly illuminated as the low-beam module. To generate an illuminated projection lens in a high-beam module designed as a projection module, not a pure high-beam module was used in solutions applied up to now in the state of the art but a bi-functional module (for low-beam light and high-beam light), which also generates part of the low-beam light, although this results in the disadvantages listed below:

- additional parts required in the bi-function module: mirror shutter, precise adjustment mechanism in the high-beam module, LEDs, heat sink,
- additional effort and expenditure in manufacturing: precise adjustment of two light modules (low-beam module and bi-function module) involved in the provision of the low-beam light
- inhomogeneous appearance: insufficient illumination of the projection lens of the bi-function module, and
- high power consumption, high heat output.

SUMMARY OF THE INVENTION

Based on the described state of the art, this invention addresses the problem of making all light modules appear approximately equally bright for an observer located in the glare-free zone in front of the motor vehicle (i.e., above an upper approximately horizontal cut-off line and/or in a darker area next to an approximately vertical cut-off line)

looking towards the emitted light of the headlight for a headlight having several light modules when one of the light modules is activated.

To solve this problem, an improved motor vehicle headlight is proposed. In particular, the motor vehicle headlight of the present invention includes at least one main-light module of the headlight that provides a dipped main-light function having a mainly horizontal cut-off line and at least one secondary light module of the headlight that provides two individually controllable light functions, to wit, one main-light function and one less powerful additional light function. To provide the dipped light function of the headlight, the dipped main-light function of the at least one main-light module is activated and the main-light function of the at least one secondary light module is deactivated or only activated in such a way that the at least one secondary light module appears darker to an observer than the at least one main-light module when viewed towards the emitted light of the headlight without activation of the additional light function of the at least one secondary light module. When providing the dipped light function of the headlight, the additional light function of the at least one secondary light module is additionally activated, such that the at least one secondary light module appears brighter to an observer looking towards the emitted light of the headlight than without the additional light function. For providing the additional light function, the at least one secondary light module has a light guide plate into which at least one light source, which is not used to provide the main-light function of the at least one secondary light module, couples light, which propagates in the light guide plate because of total reflection, the light guide plate having light outputting elements for outputting the propagating light out of the light guide plate via a light-emitting surface of the light guide plate. The light output from the light guide plate illuminates an area above the cut-off line of the dipped main-light function of the at least one main-light module.

If a secondary light module of the headlight, when implementing a dipped light function of the headlight by activating the dipped main-light function of the main-light module from the front in the glare-free zone (above the cut-off line) appears substantially darker than the main-light module, this secondary light module that is darker or the main-light function of which has been switched off, is illuminated at low intensities of the additional light function of the secondary light module without blinding an observer. In particular, the night-time appearance of a secondary light module, which is not in operation with regard to its main-light function, emulates that of the main-light module. The light guide plate is designed in such a way that the luminance is distributed as evenly as possible across the light-emitting surface. For this purpose, a scatter pattern may be formed on the light-emitting surface, at least in certain areas, which scatters the output light in a horizontal and/or vertical direction.

In accordance with an advantageous further development of the invention, it is proposed that the at least one main-light module is designed to provide a dipped main-light function in the form of a low-beam distribution. Accordingly, it is proposed that the at least one secondary light module is designed to provide a main-light function in the form of a high-beam distribution. The high-beam distribution comprises in particular a line-like or block-like high-beam distribution which has at least two individually controllable and illuminable lines or block segments arranged side by side in the horizontal direction in the distant region above the cut-off line of the dipped main-light function of the at least one main-light module, these segments generally forming part of a number of line-like or block-like segments, each having a horizontal width of approximately 0.5°-10°, which, arranged side by side, cover the high-beam range, preferably above the horizontal cut-off line, in front of the vehicle. These at least two segments are normally activated in this special main-beam mode of the headlight and can be selectively activated, dimmed or deactivated depending on the position and number of other road users in front of the vehicle to prevent blinding other road users. The other road users are detected by suitable sensors in the motor vehicle, e.g., by one or more cameras, radar sensors, ultrasonic sensors or the like, and by evaluating the sensor signals in a processing unit of the motor vehicle. Depending on the position and number of road users detected, control signals are generated for the secondary light module, in particular for light sources for providing the main-light function of the secondary light module, to selectively activate, dim or deactivate the individual lines or block segments.

According to one embodiment of this invention, light sources for providing the main-light function and the additional light function of the at least one secondary light module are formed as semiconductor light sources, in particular as light-emitting diodes or as laser diodes, and are arranged on one joint circuit board. Thus, all semiconductor light sources of the secondary light module are arranged and contacted on one joint circuit board. One joint heat sink for all semiconductor light sources thus suffices, and the installation of the light module is considerably simplified. The arrangement of the light sources for providing the additional light function of the secondary light module on the board is rendered possible in particular by using a suitably designed light guide plate, in particular having deflection prisms, for providing the additional light function. In one embodiment, the secondary light module has fewer light sources and/or light sources of lower power for providing the additional light function than light sources for the main-light function.

Advantageously, the at least one secondary light module is designed as a projection module having at least one imaging secondary optics, wherein the main light-emission directions of the light-emitting surfaces of light sources for providing the main-light function of the at least one secondary light module or the main light-emission directions of the light-emitting surfaces of primary optics assigned to these light sources preferably face the secondary optics and are arranged in the area of a focal plane of the at least one secondary optics. The secondary optics map the emitting surfaces of the light sources or the primary optics onto the roadway in front of the vehicle. The primary optics are used to focus and shape the light emitted by the light sources. They are, for instance, designed as refractive and totally reflective beam shaping optics, lenses or reflectors. The secondary optics of the secondary light module is preferably designed as a projection lens. In one embodiment, the main-light module and the secondary light module are designed as projection modules. It is proposed that the additional light function of the secondary light module illuminates the entire secondary optics, which projects an intermediate light distribution from the focal plane onto the roadway in front of the vehicle, in particular the entire input surface of the projection lens. To this end, the most uniform possible illumination of the input surface is usually at the goal. In one embodiment, both the main-light function and the additional light function each completely illuminate one input surface of the projection lens.

According to another advantageous further development of the invention, it is proposed that the light-emitting surface of the light guide plate is located in the area of the focal plane of the secondary optics. The secondary optics map the light-emitting surface on the roadway in front of the vehicle. It is further proposed that the light-emitting surface of the light guide plate is located at a short vertical distance from a horizontal plane of the secondary light module containing the optical axis of the secondary light module, preferably directly below the light sources for providing the main-light function. In one embodiment, the light sources for providing the main-light function of the secondary light module, viewed in the vertical direction, are arranged in the area of this horizontal plane, and the light sources for providing the additional light function and the light guide plate are arranged below this horizontal plane.

According to another embodiment of the invention, it is proposed that the secondary optics have scatter patterns at least in some areas for scattering the imaged light in the horizontal and/or the vertical direction. If the secondary optics is designed as a projection lens, scatter patterns may be formed on the light-entering surface and/or the light-emitting surface of the lens. These scatter patterns influence the light beams of both light functions in such a way that the imaging of both functions is blurred in the horizontal and/or in the vertical direction. The scatter pattern homogenizes and widens the respective light distributions and any lines or block segments of light in the horizontal and/or in the vertical direction to a defined extent. The scatter pattern can also scatter asymmetrically, such that the center of gravity of the light is shifted slightly, this then tends to be vertically up or down. The scattering has the advantage that the additional illumination of the secondary light module by the additional light function is similarly visible from different viewing directions from the outside. When the main-light function of the secondary light module is designed as a line-like or block-like high beam, it is advantageous to let horizontally adjacent high-beam lines or high-beam block segments overlap slightly, but not completely, on a measuring screen in front of the motor vehicle, resulting in vertically homogeneously illuminated lines or block segments. The scatter pattern then scatters horizontally in both directions to a maximum of about half the width of a line/block segment. In so doing, the vertical dispersion may be more pronounced, resulting in lines or block segments having a desired vertical extension. The scatter pattern can also scatter asymmetrically in the vertical direction, such that the focus of the light is shifted slightly upwards or downwards. In one embodiment, the scatter pattern can be designed downwards to dip the mapped) light. In this way, the effective range of the headlight can be extended downwards. The scatter pattern may have scatter elements that are visible to the naked eye and that have dimensions in the millimeter or centimeter range. However, it would also be conceivable that the scatter pattern is designed as a microstructure, wherein the dimensions of the structural elements are designed to be in the micrometer range or even smaller.

It may be provided that the additional light function of the secondary light module is active when the main-light function of the secondary light module is active. To this effect, it is proposed that the additional light function of the secondary light module may be active independently of an activation of the dipped main-light distribution of the main-light module when the main-light function of the secondary light module is active. However, it would of course also be conceivable to deactivate the additional light function of the secondary light module when the main-light function of the secondary light module is active, and to activate the additional light function of the secondary light module only when the main-light function of the main-light module is active.

It is further proposed that the secondary light module, in particular the light sources intended to provide the additional light function and the light guide plate, be designed such that the luminous intensity of the additional light function is between 10 cd and 400 cd. If the main-light module is designed to provide different main-light functions, it would also be conceivable that the secondary light module is designed in such a way that the luminous intensity of the additional light function can be automatically adjusted as a function of a currently active main-light function of the at least one main-light module in such a way that sufficient ambient light is provided, but at the same time all activated modules together do not provide any impermissible glare.

In this context, it is proposed that the additional light function of the secondary light module, in conjunction with the dipped main-light function of the main-light module or a part thereof, in particular with the part of the main-light function illuminating the zone above the cut-off line of a dipped light distribution, fulfill legal demands on a signal light function of motor vehicles, in particular for side marker lights or a daytime running lights.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 8:
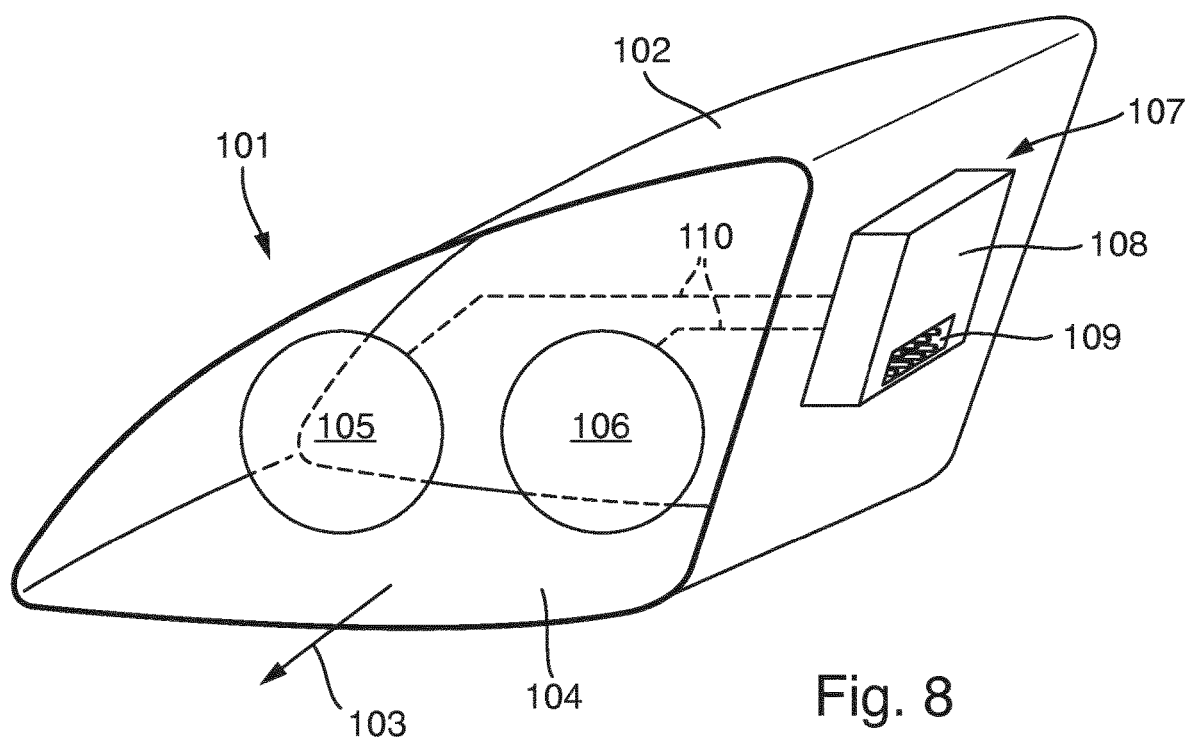
FIG. 8 shows a schematic view of a headlight according to the invention for motor vehicles.

In FIG. 8, a motor vehicle headlight incorporating the invention in its entirety is designated by the reference numeral 101. The headlight 101 comprises a housing 102, which is preferably made of plastic. The headlight housing 102 has a light-emitting opening which is closed by a transparent cover lens 104 in one light-emitting direction 103. The cover lens 104 is made of colorless plastic or glass. The lens 104 can be designed as a so-called clear lens without optically effective grooves or ridges. Alternatively, the lens 104 may be provided, at least in some areas, having optically effective grooves or ridges (e.g., cylindrical lenses or prisms), which cause the light passing through to be scattered, preferably in a horizontal direction.

There are two light modules 105, 106 inside the headlamp housing 102 in the example shown, which are only drawn schematically. The light modules 105, 106 are stationary or movable relative to the housing 102. Swiveling headlights can be implemented by moving the light modules 105, 106 relative to the housing 102 in a horizontal direction. A headlight leveling system can be implemented by moving the light modules 105, 106 about a horizontal axis, i.e., in vertical direction. Of course, the headlight housing 102 can also contain more than the two light modules 105, 106 shown. Below, the light module 105 is referred to as the main-light module and the light module 106 as the secondary light module.

A control unit 107 is located in a control unit housing 108 on the outside of the headlight housing 102. Of course, the control unit 107 can also be arranged at any other suitable place of the lighting device 101. A separate control unit may be provided for each of the light modules 105, 106, wherein the control units may be an integral part of the light modules 105, 106. Of course, the control unit 107 can also be located at a distance from the lighting unit 101, e.g., in the engine compartment of the motor vehicle. The control unit 107 is used to control and/or regulate the light modules 105, 106 or partial components of the light modules 105, 106, such as light sources (e.g., semiconductor light sources, especially LEDs) of the light modules 105, 106.

The control unit 107 is used to control the light modules 105, 106 or the partial components via connecting lines 110, which are only symbolically represented in FIG. 8 by a dashed line. The lines 110 can also be used to supply power to the light modules 105, 106. The cables 110 are routed from the inside of the lighting device 101 through an opening in the headlight housing 102 into the control unit housing 108 where they are connected to the circuit of the control unit 107. If control units are provided as an integral part of the light modules 105, 106, the lines 110 and the opening in the headlight housing 102 can be omitted. The control unit 107 comprises a connector element 109 for connecting a connecting cable to a higher-level control unit (e.g., in the form of a so-called Body Controller Unit) and/or a power source (e.g., in the form of a vehicle battery).

The headlight 101 in FIG. 8 is equipped with a main-beam headlight module 105 designed to provide a dipped main-beam function having a mainly horizontal cut-off line. The main-light module 105 is preferably designed as a projection module; however, it can also be implemented as a reflection module. The dipped main-light function is a light function having an upper cut-off line that is not only activated for a short time. In particular, the main-light function of the main-light module 105 may be a low-beam light or a front fog light. The headlight 101 also has a secondary light module 106, which is designed to provide two individually controllable light functions, to with one main-light function and one less powerful additional light function. In one embodiment, the secondary light module 106 is designed as a projection module. The main-light function of the secondary light module 106 is a high beam, for instance. The additional light function is, for instance, an illumination function for illuminating the secondary light module 106 in certain situations such that an observer located in the glare-free zone in front of the motor vehicle (i.e. above an upper approximately horizontal cut-off line 202, 204 and/or in a darker area next to an approximately vertical cut-off line) has the impression, when looking in a line of sight against the light-emitting direction 103, that the main-light module 105 and the secondary light module 106 have approximately the same brightness. The additional light function can also be described as ambient lighting for the secondary light module 106.

The high-beam distribution as the main-light function of the secondary light module 106 comprises a line-like or block-like high-beam distribution which has at least two individually controllable and illuminable lines or block segments in a distant region 212 above the cut-off line 202, 204 of the dipped main-light function of the main-light module 105, arranged side by side in the horizontal direction. These are normally activated in the main-beam mode of the headlight 101 and can be selectively activated, dimmed or deactivated depending on the position and number of other road users in front of the vehicle to prevent blinding other road users.

Figure 5:
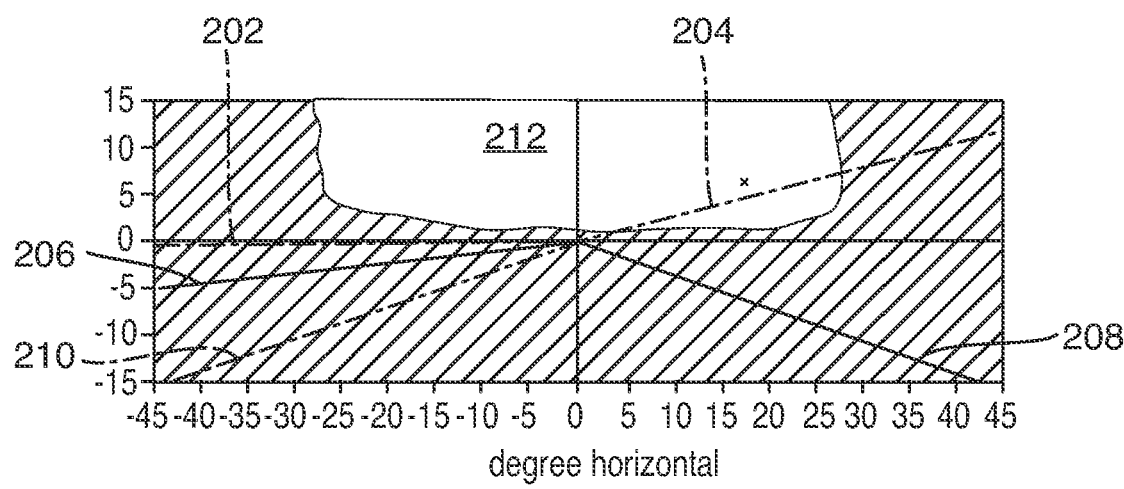
FIG. 5 shows a simulation of a light beam emitted by the additional light function of the secondary light module on a measuring screen placed in front of the motor vehicle equipped with the headlight according to the invention at a distance from the vehicle.

FIG. 5 shows a situation in which the additional light function of the secondary light module 106 is activated. The additional light function is activated, for instance, when the headlight 101 provides a dipped light function. In FIG. 5, one edge of the road on the side of the oncoming traffic is designated by the reference numeral 206 and one edge of the road on the vehicle's side is designated by the reference numeral 208. An indicated center line 210 divides the two separate lanes of traffic traveling in opposite directions. A dipped light function in the form of a low-beam light would illuminate an area on a screen in front of the motor vehicle, as shown in FIG. 5, which is mainly below an upper cut-off line 202, 204. An asymmetrical cut-off line is shown having a mainly horizontal part 202 directed at the oncoming traffic 206 and a part 204 rising towards the edge of the carriageway 208 on the vehicle's traffic side. When the low-beam light is used, in particular the area below the cut-off line 202, 204 is illuminated. The area above the cut-off line 202, 204 is usually only illuminated at very low luminous intensities to avoid blinding other road users.

To implement the low-beam light, the dipped main-light function of the main-light module 105 is activated, such that the main-light module 105 provides a low-beam light, for instance. The main-light function of the secondary light module 106 is deactivated, i.e., the secondary light module 106 does not provide a high beam. Alternatively, the main-light function of the secondary light module 106 may also be activated in such a way that the secondary light module 106 appears darker to an observer than the main-light module 105 towards the emitted light 103 of the headlight 101 without activating the additional light function of the secondary light module 106. The above situation thus includes all cases in which the main-light module 105 produces a dipped light distribution and the secondary light module 106 appears darker than the main-light module 105 to an observer looking towards the emitted light 103. When the dipped light function of the headlight 101 is provided, the additional light function of the secondary light module 106 is additionally activated such that the secondary light module 106 appears brighter towards the emitted light 103 of the headlight 101 for the observer located in the glare-free zone in front of the motor vehicle (i.e. above an upper approximately horizontal cut-off line 202, 204 and/or in a darker area next to an approximately vertical cut-off line) than without the additional light function. The additional light function illuminates a part of the distant region 212 above the cut-off line 202, 204 (see FIG. 5). The low-beam light of the main-light module 105 and the additional light function of the secondary light module 106 in the distant region 212 conjointly make up the dipped light function of the headlight 101.

Figure 1:
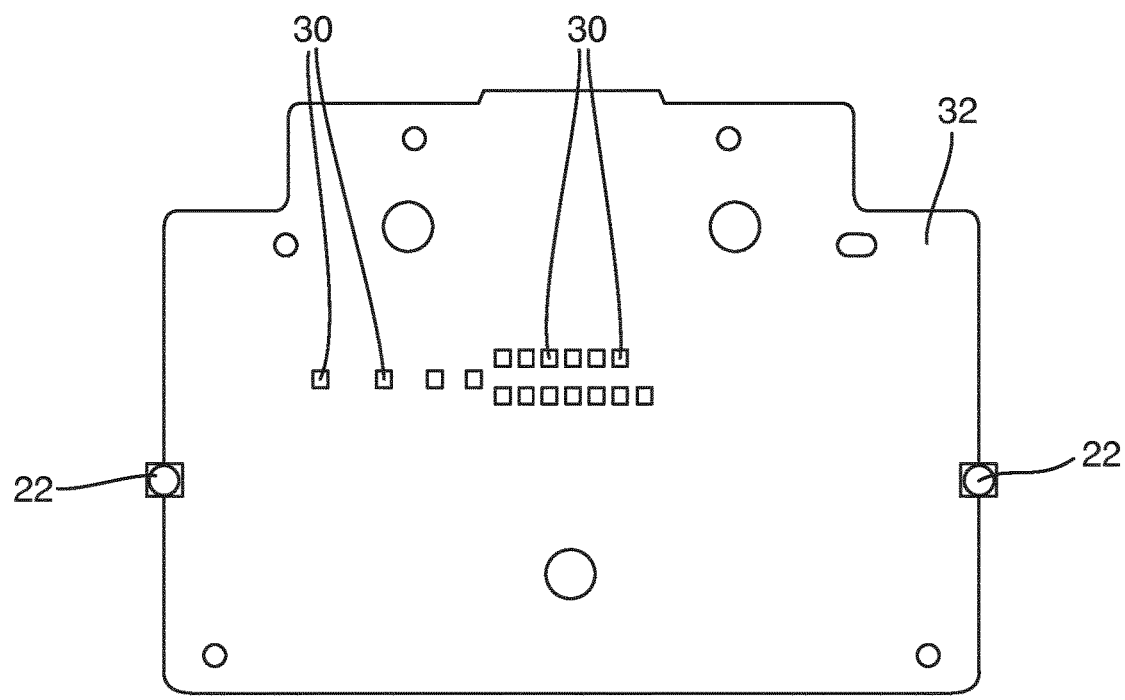
FIG. 1 shows a plan view of a circuit board of a secondary light module of a headlight for motor vehicles according to the invention, having LED light sources arranged thereon for providing a main-light function and an additional light function of the secondary light module.
Figure 2:
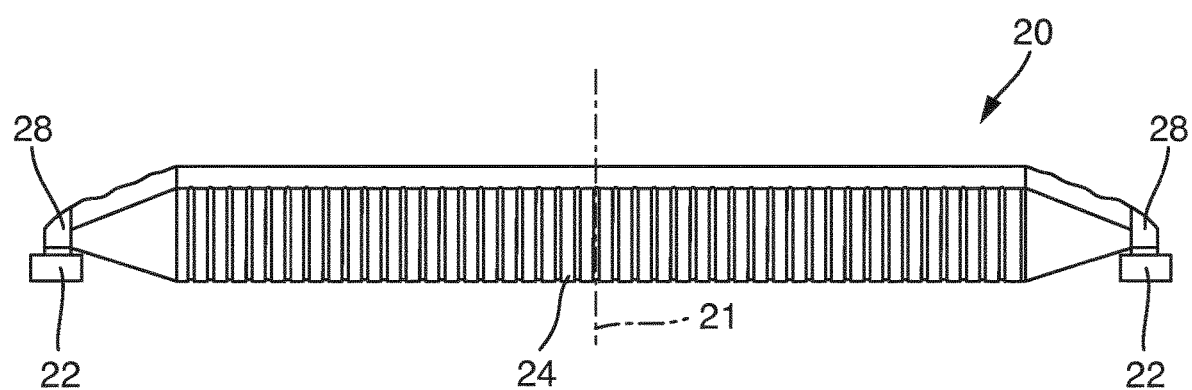
FIG. 2 shows a perspective rear oblique view of a light guide plate of a secondary light module of a headlight for motor vehicles according to the invention, for providing an additional light function of the secondary light module.
Figure 3:
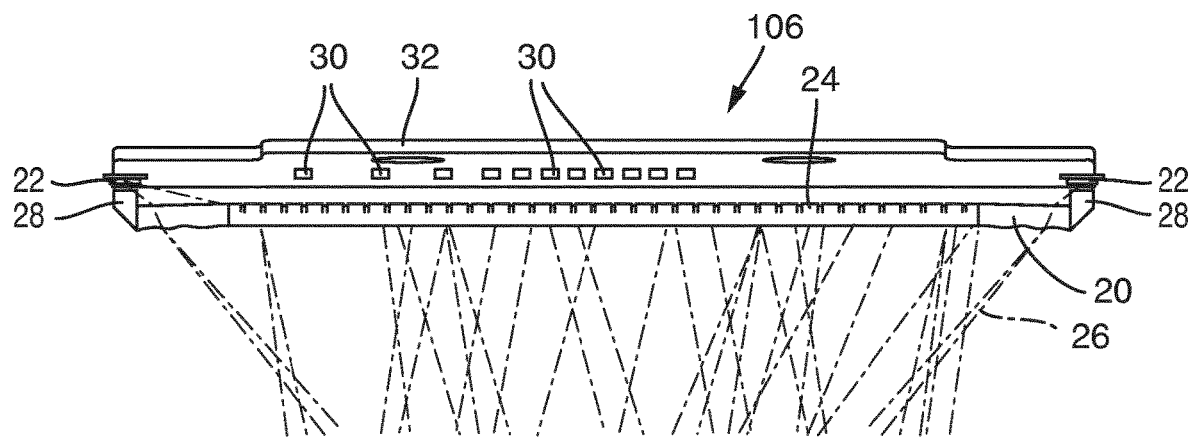
FIG. 3 shows a plan view of a part of a secondary light module of a headlight according to the invention for motor vehicles, for providing an additional light function of the secondary light module.

To provide the additional light function, the secondary light module 106 has a light guide plate 20, into which at least one light source 22, which is not used to provide the main-light function of the secondary light module 106, couples light. An example of such a light guide plate 20 is shown in FIG. 2. Two light sources 22 are provided, which couple light on opposite sides into the light guide plate 20. The light guide plate 20 is equipped with deflecting prisms 28, which deflect the light input from the light sources 22 into the body of the light guide plate 20. The input light is propagated in the light guide plate 20 because of total reflection. The light guide plate 20 has output elements 24 for outputting the propagating light from the light guide plate 20 via a light-emitting surface 26 of the light guide plate 20. The light-emitting surface 26 is formed on a side of the light guide plate 20 opposite from the output elements 24. The light output from the light guide plate 20 illuminates an area 212 of the light distribution of the headlight 101 above the cut-off line 202, 204 of the dipped main-light function of the main-light module 105 (see FIG. 5). The light guide plate 20 is designed in such a way that the luminance of the output light is distributed as homogeneously as possible across the light-emitting surface 26. For this purpose, a scatter pattern may be formed at least in certain areas of the light-emitting surface 26, which scatters the output light in a horizontal and/or vertical direction. The light guide plate 20 of FIG. 2 is rotated 180° about a vertical central axis 21 and then placed on the plate 32 shown in FIG. 1 such that the light from the drawing plane is output out of the light guide plate 20 via the light-emitting surface 26.

In other words, this means that if a secondary light module 106 of the headlight 101, when implementing a dipped light function of the headlight 101 by activating the dipped main-light function of the main-light module 105 from the front in the glare-free zone (above the cut-off line 202, 204) appears darker than the main-light module 105, this secondary light module 106 that is darker or the main-light function of which has been switched off, is additionally illuminated at low intensities of the additional light function of the secondary light module 106 without blinding the observer. In one embodiment, the night-time appearance of a secondary light module 106, which is not in operation with regard to its main-light function, emulate that of the activated main-light module 105.

In addition to the light sources 22 for implementing the additional light function, the secondary light module 106 has further light sources 30 for implementing the main-light function of the secondary light module 106. The light sources 22, 30 of the secondary light module 106 for providing the main-light function and the additional light function are preferably designed as semiconductor light sources, in particular as light-emitting diodes (LEDs) or as laser diodes. In one embodiment, the light sources 22, 30 of the secondary light module 106 are arranged on a joint circuit board 32. One joint heat sink for all semiconductor light sources 22, 30 is thus sufficient, and the installation of the light module 106 is considerably simplified in that way. The arrangement of the light sources 22 on the joint circuit board 32 is made possible in particular by the use of a suitably designed light guide plate 20, if necessary, having deflecting prisms 28, for providing the additional light function of the secondary light module 106. Preferably, the secondary light module 106 shall have fewer light sources 22 and/or light sources of lower power for the additional light function than the light sources 30 for the main-light function.

Figure 4:
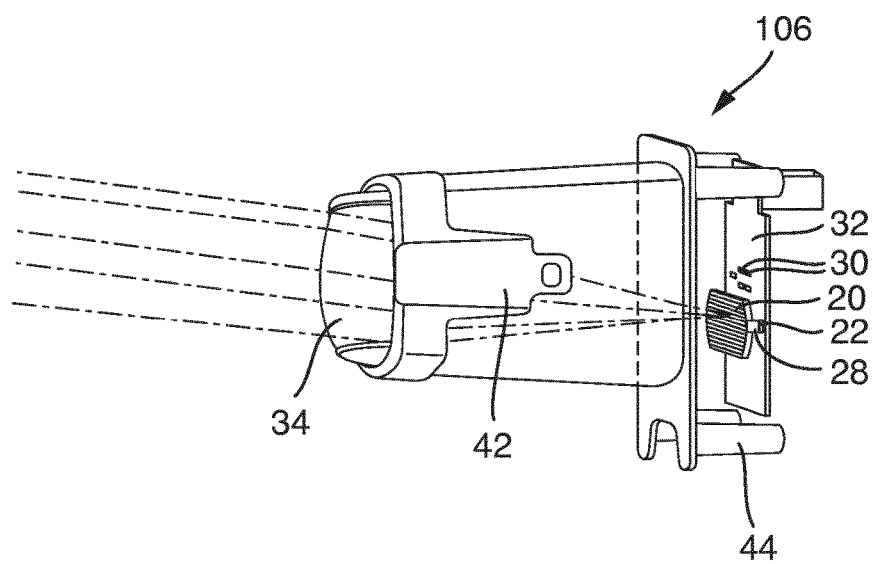
FIG. 4 shows a perspective view of a secondary light module of a headlight according to the invention for motor vehicles, showing light beams drawn as examples during the provision of an additional light function of the secondary light module.

The secondary light module 106 is preferably designed as a projection module having an imaging secondary optics 34 (cf. FIG. 4), the main radiation direction of the light-emitting surfaces of light sources 30 for providing the main-light function of the secondary light module 106 or the main radiation direction of the light-emitting surfaces 38 of primary optics 40 (cf. FIG. 7D) assigned to the light sources 30 preferably point to the secondary optics 34 and are arranged in the area of a focal plane 36 of the secondary optics 34. The emitting surfaces of light sources 30 or, if primary optics 40 are fitted, the emitting surfaces 38 of the primary optics 40 are mapped by secondary optics 34 on the road ahead of the motor vehicle equipped with the headlight 101 to provide the main light function of the secondary light module 106. The primary optics 40 are used to focus and shape the light emitted by the light sources 30. They are, for instance, designed as refractive and/or totally reflective beam shaping optics, as lenses or as mirror reflectors. In this way, all main radiation directions of light emission surfaces of the light sources 22 and 30 are directed towards the secondary optics 34, i.e., essentially in parallel to the surface of a circuit board 32, on which the light sources 22, 30 are arranged (secured and electrically contacted).

In one embodiment, the projection lens may take the form of secondary optics 34 of the secondary light module 106. This is secured, for instance, by a tube-like lens holder 42 via retaining bars 44 to the remaining light module 106, in particular with regard to the circuit board 32. In one embodiment, both the main-light module 105 and the secondary light module 106 are designed as projection modules. The additional light function of the secondary light module 106 completely illuminates the entire secondary optics 34, which project an intermediate light distribution from the focal plane 36 onto the roadway in front of the motor vehicle, in particular the entire input surface of the projection lens (cf. FIG. 4). To this end, the most uniform possible illumination of the input surface is usually aimed at. In one embodiment, both the main-light function and the additional light function of the secondary light module 106 each completely illuminate one input surface of the projection lens 34.

Figure 7A:
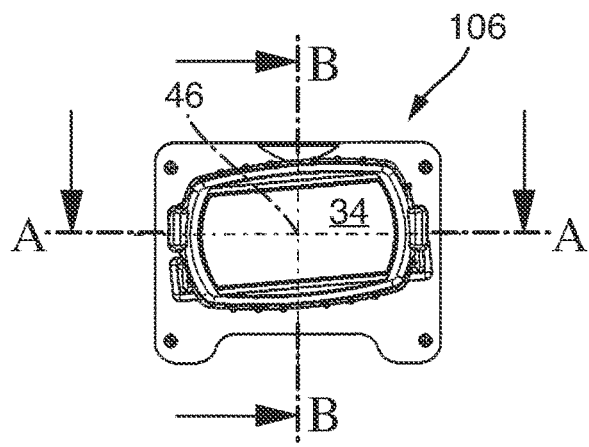
FIGS. 7A to 7D show different views of a secondary light module of a headlight according to the invention for motor vehicles, comprising a view towards the light-emitting direction, a vertical section along an optical axis, a top view and an enlarged section of the vertical section.
Figure 7B:
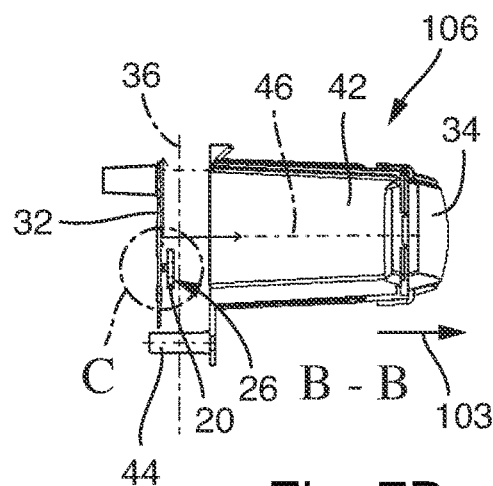
Figure 7C:
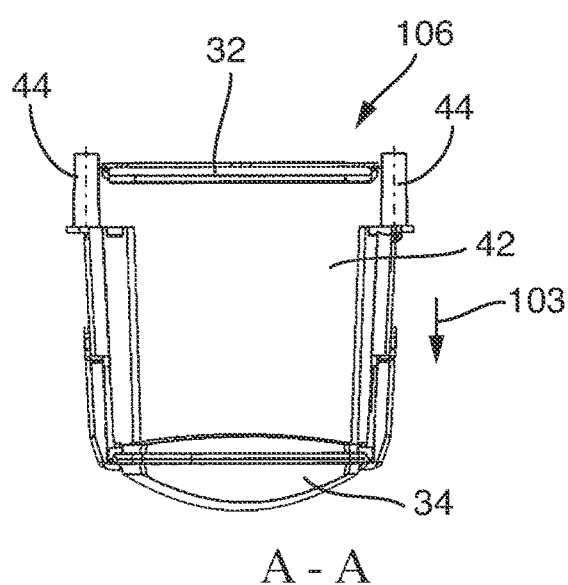
Figure 7D:
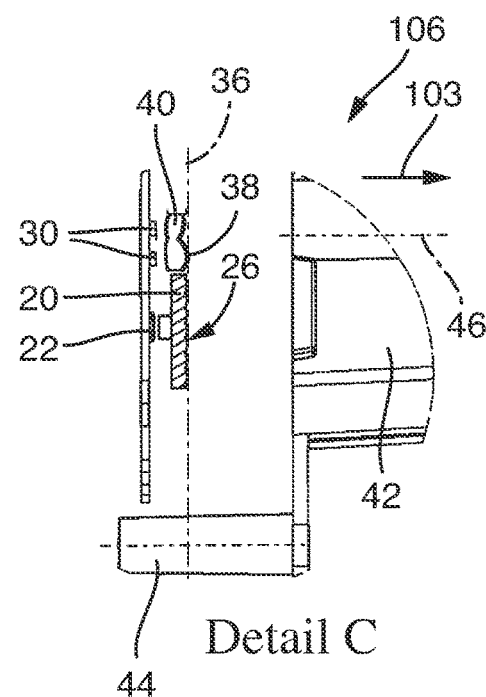

FIGS. 7B and 7D show that the light-emitting surface 26 of the light guide plate 20 is arranged in the area of the focal plane 36 of the secondary optics 34. The secondary optics 34 map light-emitting surface 26 on the roadway in front of the vehicle. The light-emitting surface 26 of the light guide plate 20 is arranged at a small vertical distance from a horizontal plane of the secondary light module 106, which horizontal plane contains an optical axis 46 of the secondary light module 106, which may be directly below the light sources 30 for providing the main-light function. In one embodiment, the light sources 30 for providing the main-light function of the secondary light module 106, viewed in the vertical direction, are arranged in the area of this horizontal plane, and the light sources 22 for providing the additional light function and the light guide plate 20 are arranged below this horizontal plane.

Figure 6A:
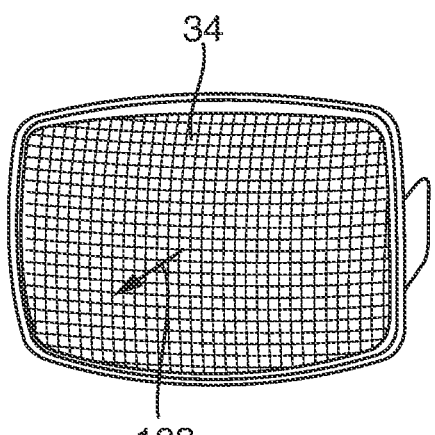
FIGS. 6A and 6B show a night design of a projection lens of a secondary light module of a headlight according to the invention for motor vehicles from different perspectives.
Figure 6B:
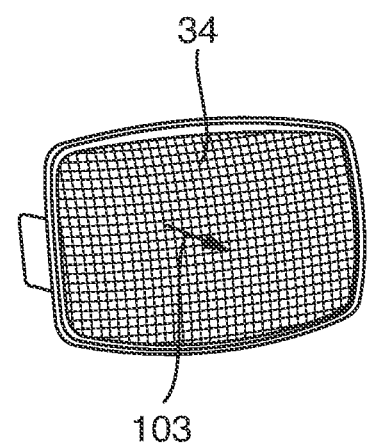

Secondary optics 34 can have scatter patterns at least in some areas to scatter the imaged light in the horizontal and/or the vertical direction. If the secondary optics 34 is designed as a projection lens—as in the examples shown here—scatter patterns may be formed on the light-entering surface and/or the light-emitting surface of the lens. The scatter patterns influence the light beams of both light functions of the secondary light module 106 passing through the projection lens 34 in such a way that the image of the light functions is blurred in the horizontal and/or the vertical direction. The scatter pattern homogenizes and widens the respective light distribution and any lines or block segments of light in the horizontal and/or vertical direction to a defined extent. The scatter pattern can also scatter asymmetrically, such that the center of gravity of the light is shifted slightly, this then tends to be vertically up or down. The scattering element has the advantage that the additional illumination of the secondary light module 106 by the additional light function is similarly visible from different viewing directions from the outside. This can be clearly seen in FIGS. 6A and 6B, where a view towards the light-emitting surface of the projection lens 34 against the light-emitting direction 103 is shown from different viewing directions. When the main-light function of the secondary light module 106 is designed as a line-like or block-like high beam, it may be advantageous to let horizontally adjacent high-beam lines or high-beam block segments overlap slightly, but not completely, on a measuring screen in front of the motor vehicle (cf. FIG. 5), resulting in vertically homogeneously illuminated lines or block segments. The scatter pattern then scatters horizontally in both directions to a maximum of about half the width of a line/block segment. In so doing, the vertical dispersion may be more pronounced, resulting in lines or block segments having a desired vertical extension. The scatter pattern can also scatter asymmetrically in the vertical direction, such that the focus of the light is shifted slightly upwards or downwards.

It may be proposed that the additional light function of the secondary light module 106 may be active independently of an activation of the dipped main-light distribution of the main-light module 105 when the main-light function of the secondary light module 106 is active. However, it would of course also be conceivable to deactivate the additional light function of the secondary light module 106 when the main-light function of the secondary light module 106 is active, and to activate the additional light function of the secondary light module 106 only when the main-light function of the main-light module 105 is active.

The secondary light module 106, in particular the light sources 22 intended to produce the additional light function and the light guide plate 20, be designed such that the luminous intensity of the additional light function is between 10 cd and 400 cd. If the main-light module 105 is designed to provide different main-light functions or several main-light modules 105 are provided for providing different main-light functions, it would also be conceivable to design the secondary light module 106 in such a way that the luminous intensity of the additional light function can be adjusted automatically as a function of a currently active main-light function of the at least one main-light module 105 in a suitable manner, e.g. such that sufficient illumination of the glare-free zone is achieved, but at the same time no impermissible glare is provided in the sum of all active modules. In this context, it is proposed that the additional light function of the secondary light module 106, in conjunction with the dipped main-light function of the main-light module 105 or a part thereof, in particular with the part of the main-light function illuminating the zone 212 above the cut-off line 202, 204 of the dipped light distribution, fulfill legal requirements for a signaling light function of motor vehicles, in particular for side marker light or a daytime running light.

The control unit 107 can be used to control the light sources 22 for providing the additional light function of the secondary light module 106. It is proposed that the control unit 107 should have a microprocessor on which a computer program can be run which, depending on certain ambient and operating conditions of the headlight 101, accordingly controls the light sources 22 when running on the microprocessor. The light sources 22 can be switched on and off and dimmed as part of the control system.

The headlight 101 according to the invention including the design of the secondary light module 106 according to the invention can be used to illuminate the secondary optics 34 particularly homogeneously such that the secondary light module 106 appears to be illuminated from different viewing angles in the viewing direction towards the emitted light 103. Because the secondary light module 106 no longer has to fulfill any other main-light functions (e.g., high-beam light) in addition to one main-light function (e.g., low-beam light), especially since the secondary light module 106 is not designed as a bi-functional light module, it is simple in design and inexpensive to manufacture. This results in a low material input in the secondary light module 106 (low number or low-power LED light sources 22 for the additional light function, no mirror shutter to provide a cut-off line, low energy consumption, low heat output, thus allowing the use of smaller and lighter heat sinks). The adjustment mechanism in the headlight 101 corresponds to that of a conventional high-beam module. The production effort for module adjustment also corresponds to that of a conventional high-beam module. A complicated adjustment mechanism, as required for a bi-function light module, is not needed. All in all, the invention results in a headlight 101, which is implemented in an effective and economical manner in such a way that its at least two individual modules 105, 106 (usually arranged side by side) appear to be equally illuminated from different directions of view towards the emitted light 103.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A motor vehicle headlight having at least two light modules, which is designed to provide at least one dipped light function in a light-emitting direction of the headlight, said motor vehicle headlight comprising:
   at least one main-light module for providing a dipped main-light function is designed having a substantially horizontal cut-off line,
   at least one secondary light module designed to provide two individually controllable light functions, to emit one main-light function and one less powerful additional light function,
   wherein to provide the dipped light function of the headlight, the dipped main-light function of the at least one main-light module is activated and the main-light function of the at least one secondary light module is deactivated or only activated in such a way that the at least one secondary light module appears darker to an observer than the at least one main-light module when viewed towards the emitted light of the headlight without activation of the additional light function of the at least one secondary light module, wherein the additional light function of the at least one secondary light module is additionally activated to provide the dipped light function of the headlight, such that the at least one secondary light module appears brighter to an observer looking towards the emitted light of the headlight than without the additional light function, said at least one secondary light module includes a light guide plate for providing the additional light function, into which light guide plate at least one light source, which is not used to provide the main-light function of the at least one secondary light module, couples light, which propagates in the light guide plate because of total reflection, the light guide plate having light outputting elements for outputting the propagating light out of the light guide plate via a light-emitting surface of the light guide plate, and wherein the light output of the light guide plate illuminates a region above the cut-off line of the dipped main-light function of the at least one main-light module.

2. The headlight as set forth in claim 1, wherein the at least one main-light module is designed to provide a dipped main-light function in the form of a low-beam distribution.

3. The headlight as set forth in claim 1, wherein the at least one secondary light module is designed to provide a main-light function in the form of a high-beam distribution.

4. The headlight as set forth in claim 3, wherein the at least one secondary light module is designed to generate a main light function in the distant region above the cut-off line of the dipped main-light function of the main-light module in the form of a line-like or block-like high-beam distribution, which has at least two individually controllable and illuminable lines or block segments arranged side by side in the horizontal direction.

5. The headlight as set forth in claim 1, wherein light sources for providing the main-light function and the additional light function of the at least one secondary light module are designed as semiconductor light sources, in particular as light-emitting diodes or as laser diodes, and are arranged on a joint circuit board.

6. The headlight as set forth in claim 1, wherein the at least one secondary light module is designed as a projection module having at least one imaging secondary optics, wherein light-emitting surfaces of light sources for providing the main-light function of the at least one secondary light module or light-emitting surfaces of primary optics assigned to the light sources are arranged in the area of a focal plane of the at least one secondary optics.

7. The headlight as set forth in claim 6, wherein the secondary optics of the secondary light module is formed as a projection lens.

8. The headlight as set forth in claim 7, wherein the secondary light module is formed such that the main-light function and the additional light function each completely illuminate an input surface of the projection lens.

9. The headlight as set forth in claim 6, wherein the light-emitting surface of the light guide plate is arranged in the focal plane of the secondary optics.

10. The headlight as set forth in claim 6, wherein the secondary optics have scatter patterns at least in some areas for scattering the imaged light in the horizontal and/or vertical direction.

11. The headlight as set forth in claim 1, wherein the secondary light module has fewer light sources and/or light sources of lower power for providing the additional light function than light sources for providing the main-light function.

12. The headlight as set forth in claim 1, wherein the light-emitting surface of the light guide plate is arranged at a small vertical distance from a horizontal plane of the secondary light module, which horizontal plane contains the optical axis of the secondary light module, preferably directly below the light sources for providing the main-light function.

13. The headlight as set forth in claim 1, wherein the additional light function of the secondary light module is active independently of activation of the dipped main-light distribution of the main-light module when the main-light function of the secondary light module is active.

14. The headlight as set forth in claim 1, wherein the light-emitting surface of the light guide plate has scatter patterns at least in some areas for scattering the output light horizontally and/or vertically.

15. The headlight as set forth in claim 1, wherein the secondary light module is designed such that the luminous intensity of the additional light function is between 10 cd and 400 cd.

16. The headlight as set forth in claim 1, wherein the secondary light module is designed such that the luminous intensity of the additional light function can be automatically adjusted as a function of a currently active dipped main-light function of the at least one main-light module.

17. The headlight as set forth in claim 1, wherein the additional light function of the secondary light module in conjunction with the dipped main-light function of the main-light module fulfill legal demands on a signal light function for motor vehicles, in particular for side marker lights or daytime running lights.

* * * * *